United States Patent

[11] 3,553,466

| [72] | Inventor | James Stewart Johnston<br>Bognor Regis, England |
|---|---|---|
| [21] | Appl. No. | 608,568 |
| [22] | Filed | Jan. 11, 1967 |
| [45] | Patented | Jan. 5, 1971 |
| [73] | Assignee | Rosemount Engineering Company Limited<br>Bognor Regis, England |
| [32] | Priority | Jan. 13, 1966 |
| [33] | | Great Britain |
| [31] | | No. 1730/66 |

[54] PLURALITY OF LONGITUDINALLY SCANNED FLUORESCENT LIGHT-CONDUCTIVE FIBERS DIFFERENTIALLY MASKED FOR BEAM POSITION DETECTION
10 Claims, 12 Drawing Figs.

[52] U.S. Cl................................................. 250/227,
250/237, 250/230, 250/43.5, 250/71, 250/231
[51] Int. Cl........................................................ G02b 5/16,
G01d 5/34
[50] Field of Search............................................ 250/227,
230, 237

[56] References Cited
UNITED STATES PATENTS

| 2,765,458 | 10/1956 | Hoover........................ | 250/227X |
|---|---|---|---|
| 2,883,649 | 4/1959 | King............................ | 250/227X |
| 3,141,105 | 7/1964 | Courtney-Pratt............. | 250/227X |
| 3,191,049 | 6/1965 | McNaney...................... | 250/227 |
| 3,317,738 | 5/1967 | Piepenbrink et al.......... | 250/227 |
| 3,394,976 | 7/1968 | Hawkins....................... | 250/227 |
| 3,032,657 | 5/1962 | Meier et al.................... | 250/71.5X |
| 3,169,187 | 2/1965 | Stone et al.................... | 250/71.5 |
| 3,372,240 | 3/1968 | Boyers et al.................. | 250/227X |
| 3,398,288 | 8/1968 | Sanders et al................. | 250/227X |
| 3,412,255 | 11/1968 | Krieger......................... | 250/227 |

FOREIGN PATENTS

| 1,282,307 | 12/1961 | France ........................ | 250/230 |
|---|---|---|---|

*Primary Examiner*—Robert Segal
*Attorney*—Dugger, Peterson, Johnson & Westman

ABSTRACT: For detecting the position of a beam of radiation, e.g. a light beam from a mirror galvanometer or radioactive radiation from a radioactive source on a float in a liquid level detector, or for detecting the position of a movable element, a fiber of glass or other material is used which fluoresces under the radiation and a photocell is provided at the end of the fiber for detecting the fluorescent light transmitted along the fiber. In one arrangement a rotating mask is arranged around the fiber with apertures so that different parts of the length are exposed and thus the position of the radiation along the length of the fiber is fed out in serial digital form by the photocell output. In another construction a plurality of fibers with separate masks are used so that the various photocells give a parallel digital representation of the beam position.

PATENTED JAN 5 1971
3,553,466
SHEET 1 OF 2
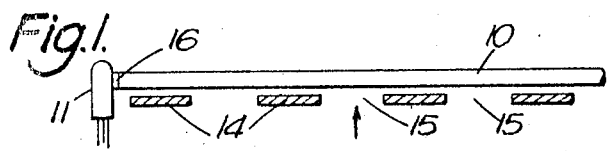
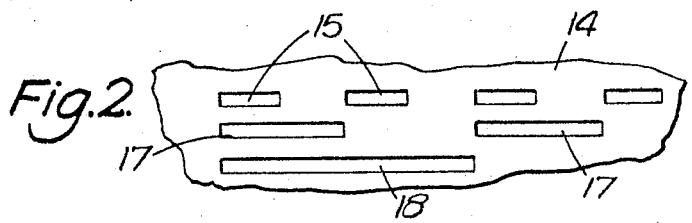
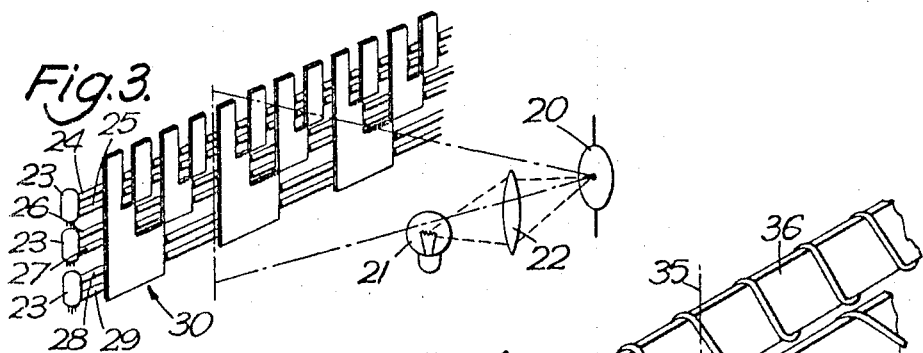
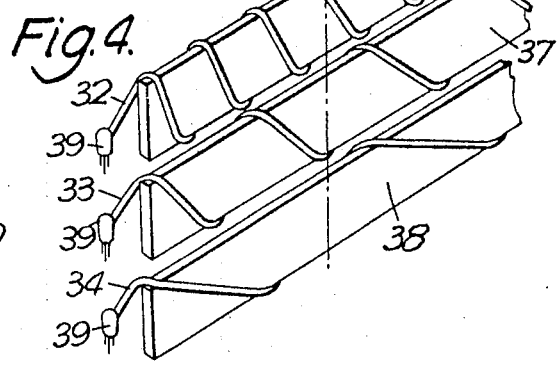
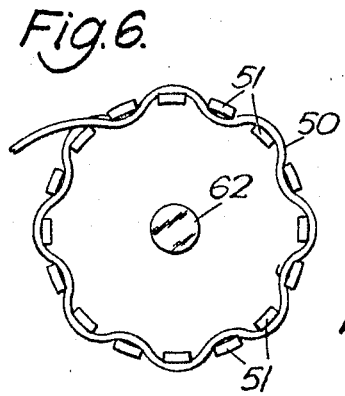
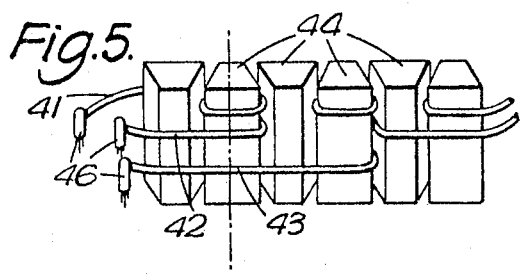
INVENTOR
JAMES STEWART JOHNSTON
BY Dugger, Peterson, Johnson &
Westman PATENTED JAN 5 1971
3,553,466
SHEET 2 OF 2
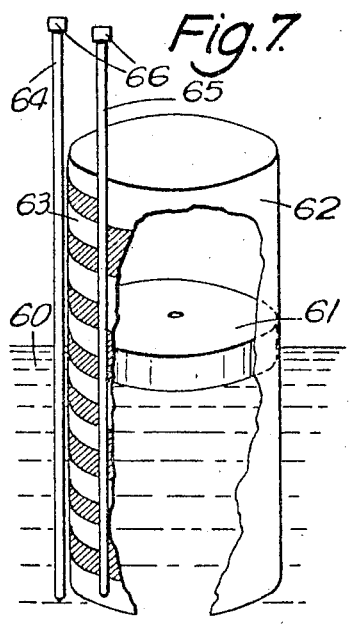
Fig. 7.
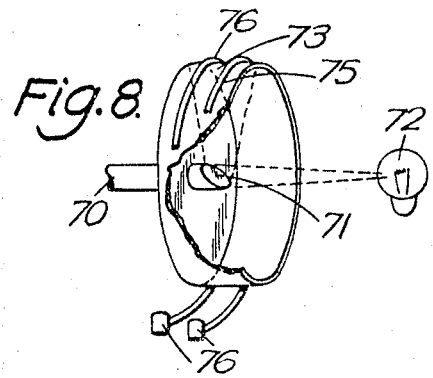
Fig. 8.
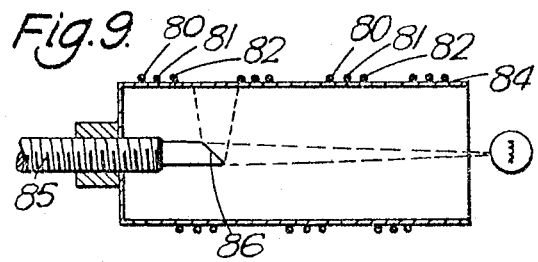
Fig. 9.
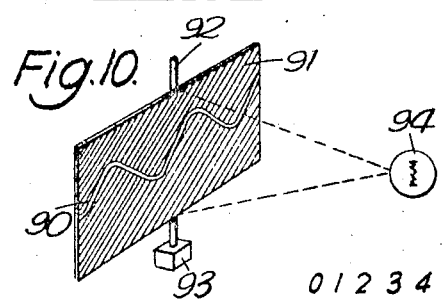
Fig. 10.
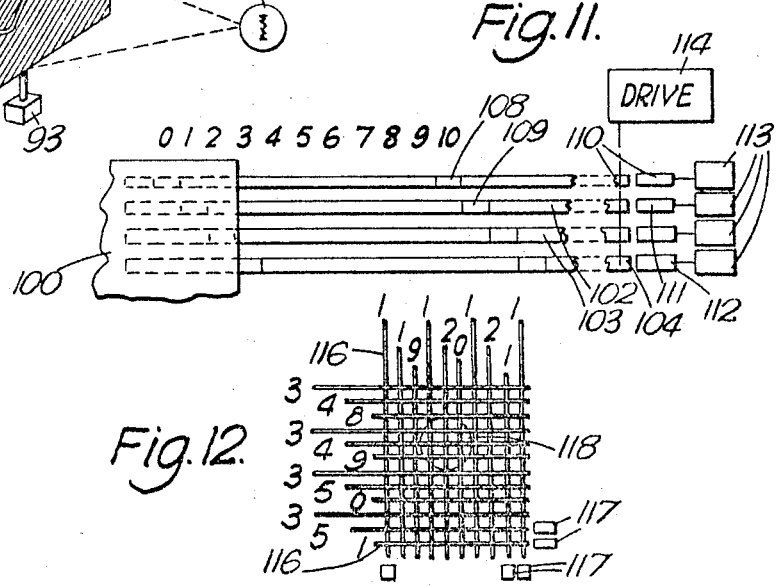
Fig. 11.
Fig. 12.
INVENTOR
JAMES STEWART JOHNSTON
BY Dugger, Peterson, Johnson
Westman

PLURALITY OF LONGITUDINALLY SCANNED FLUORESCENT LIGHT-CONDUCTIVE FIBERS DIFFERENTIALLY MASKED FOR BEAM POSITION DETECTION

This invention relates to devices which are responsive to radiation and is directed more particularly to devices for determining the position of a radiated beam such as a light beam and devices for determining the position of a movable member which is moved across a radiation from a radiation source. As will be explained hereinafter, the use of the invention enables output information to be provided in digital form representative of the position of a beam such as a light beam on the position of a movable member.

It is well known in fiber objects that light can be piped by repeated total internal reflection in a thin glass fiber. The present invention makes use of this phenomenon. It also makes use of the fact that certain specially prepared glasses and other materials will fluoresce under appropriate kinds of radiation. A number of glasses will scintillate or fluoresce brightly when radiated by gamma rays or neutrons or electrons or alpha particles or X-rays or ultraviolet or visible light. Generally speaking, in the present invention, any of these forms of radiation may be employed provided the appropriate kind of glass or other suitable transparent or translucent material is used. These types of radiation will be referred to generally as "exciting radiation." The visible light produced will be referred to as fluorescence and this expression is used to include not only the production of electromagnetic waves, e.g. visible light, of a different frequency from the incident electromagnetic radiation but also the scintillation produced by incident particle bombardment.

According to the present invention, a device for detecting the position of a beam of exciting radiation comprises a transparent or translucent fiber formed of a material which will fluoresce on exposure to the radiation, a photocell responsive to the light due to fluorescence which is transmitted along the fiber to one end thereof, and masking means preventing the radiation from striking at least one part of the length of said fiber. If a beam of the exciting radiation is directed onto the fiber transversely to its length and strikes the fiber at an unmasked position, it will cause the material to fluoresce and hence will produce an output from the photocell. If the beam is moved along the fiber to a masked position, there will be no output. The photocell thus will indicate whether the radiation is striking the fiber or is masked therefrom.

The fiber may be made of any suitable transparent or translucent material which will fluoresce when subjected to the exciting radiation. It may be glass fiber but, for some purposes, synthetic plastic materials may be employed.

In one example of the invention, a plurality of such fibers are employed, arranged side by side with different masks in front of each fiber so that the position of a beam of exciting radiation having a narrow width in the direction of the length of the fibers but striking all the fibers or masks is indicated digitally by the various outputs from the different fibers. Each fiber conveniently has its own photocell so that the digital output is available in parallel form. In a simple construction, for example, the first fiber might have the first half of its length masked and the second half exposed. The second fiber might have the first quarter of its length masked, the second quarter exposed, the third quarter masked and the fourth quarter exposed. The third fiber may have each alternate eighth part of its length masked and exposed and so on. It will readily be seen however that the masking is analogous to the coding used in mechanical and optical digitizers and any of the codes employed therein may be employed in this type of fiber optical digitizer. In particular the masking may be arranged to provide a Gray code or other cyclic permuting code such that only one digital output changes at a time as one moves the exciting radiation along the fibers.

In another arrangement, the masking means is movable and has apertures shaped so that, by movement of the masking means, successive different portions of the fiber are exposed. Thus with a single fiber and photocell, a digital output in serial binary code is obtainable representative of the position of said beam closing the length of the fiber.

The fluorescence will usually be of a different frequency from the incident radiation and the photocell may have a filter to pass only the fluorescent light.

Since the fibers are flexible, the masking, for a fixed mask system, may be effected not only by providing a physical mask with apertures in front of the fibers but by winding the fibers around opaque elements so that, for part of their length, they are each behind an element or elements so as to be masked thereby from the exciting radiation.

The direct digital encoding of the position of a radiated beam can be used for example to digitize the output from a mirror galvanometer, enabling the high accuracy due to the use of an optical lever to be employed in a system giving a digital output. An optical lever can if necessary be folded using prismatic techniques.

The present invention may be used not only to determine the position of a beam of radiation but also to determine the position of a movable member. For this purpose, the beam and the fibers might be kept fixed and a digital encoding mask moved, by the movable member, across the beam. It may be more convenient however to move a simple opaque member and, in one form of construction, a radiation source is provided which gives illumination extending along the whole length or substantially the whole length of a number of fibers, each of which is masked for part of its length, possibly over a number of discrete portions of its length, and an opaque member is movable across the radiation path, the various masks being arranged so that the position of the movable opaque member can then be determined by noting the amplitude of the outputs of various photocells on the different fibers.

As another example of this invention, a number of parallel fibers may be arranged orthogonally across a second set of parallel fibers. If a spot of light or other exciting radiation is directed onto this two-dimensional array, since the incident radiation will partly pass through the fibers of the first set, it will cause fluorescence in one or possibly more than one fiber of the first set, dependent on the size of the spot, and also in one or possibly more than one fiber in the second set. Photocells at the ends of the fibers of the two sets thus provide outputs representative of the coordinates of the position of the incident radiation on the array. By providing a feedback circuit through the deflection means for the radiation, the beam can be positioned at any required position corresponding to selected coordinates.

A number of embodiments of the invention will now be described with reference to the accompanying drawings in which:

FIG. 1 is a diagram illustrating a simple embodiment of the invention;

FIG. 2 is a view of a mask used in the embodiment of FIG. 1;

FIG. 3 is a diagrammatic perspective view illustrating an arrangement giving a digital output corresponding to the position of the light beam from the mirror galvanometer;

FIGS. 4 and 5 illustrate two alternative ways of masking of the fibers which might be used in place of the construction shown in FIG. 3;

FIG. 6 illustrates a modification of the construction of FIG. 5 to form a multiturn digitizer;

FIG. 7 shows a level detector for detecting the level of a liquid;

FIGS. 8 and 9 illustrate further digitizers;

FIG. 10 illustrates a trace reading device for obtaining a digital output corresponding to the Y value of any selected X coordinate on an analogue trace in an X-Y Cartesian coordinate system;

FIG. 11 illustrates a construction for digitizing the position of a boundary between transparent and an opaque element; and FIG. 12 is an explanatory diagram for explaining how the apparatus of the present invention may be used for determining the two dimensional coordinates of the position of a light beam or for controlling the position of a light beam in a two dimensional coordinate system.

Referring to FIG. 1, there is shown a simple form of optical digitizer for giving an output representative of the position of a light beam. A glass fiber 10 terminates at one end close to a photocell 11. The fiber is made of a fluorescent glass which will fluoresce under suitable exciting radiation, for example ultraviolet light. This fiber is used to determine the position of a narrow beam of the radiation indicated by an arrow 13. Alongside the fiber is a mask 14 having openings 15. It will be seen that, if the beam of radiation 13 is located at an opening 15 in the mask, then the fluorescent glass material will be excited and an output will be obtained from the photocell 11. If the radiation beam strikes the opaque parts of the mask, then the fluorescent material is not excited and no output is obtained from the photocell.

In the above example the radiating beam may typically be a beam of ultraviolet light. Such light will excite the fluorescent material to fluoresce at some longer wavelength in the visible light spectrum. The photocell 11 may have a filter 16 so that it is sensitive only to the wavelength of the expected fluorescence and is not excited by any direct or reflected radiation from the radiating beam. It will be appreciated that only a small proportion of the radiation incident on the light fiber will cause excitation of the appropriate states in the atoms of the fibers while a significant part of the light emitted by the excited atoms may fail to reach the photocell as a result of absorption or imperfect reflection in the remainder of the fiber. However, by the use of such a filter, it is possible to obtain adequate discrimination so that the photocell is responsive only to the fluorescence in the glass material and not to any unwanted radiation received direct from the source of the radiating beam. Such filters would therefore preferably be used in all the embodiments of the invention described below.

If a succession of masks etc., are moved in front of the fiber 10 in place of the mask 14 and, if their apertures are suitably arranged, then, for any position of the light beam along the length of the fiber, there will be a succession of outputs from the photocell 11. The mask apertures may be arranged so that these uniquely identify the position of the beam in a binary code. The various masks may be formed as a single masking element 14 with apertures 15, 17, 18 (as shown in FIG. 2) which is oscillated or rotated between the radiation source and the fiber so that these outputs are produced cyclically, giving the position of the incident beam in serial binary form. Such a device may be used for example for digitizing the position of the light beam from a mirror galvanometer. Conveniently the masking element is formed as a cylinder around the fiber 10 or around a bundle of fibers. This cylinder may be rotated together with the fiber or fibers, the photocell 11 remaining stationary.

FIG. 3 illustrates another arrangement of digitizer for digitizing the position of the light beam from a rotatable mirror, such as for example the mirror of a mirror galvanometer. In FIG. 3 the mirror is indicated at 20 and reflects a fan-shaped beam derived from a light source 21 and optical system 22. The beam in this particular embodiment is narrow in the horizontal plane but wide in the vertical plane, the vertical width being sufficient to extend across six glass fibers 24 to 29. These glass fibers are arranged in pairs in this embodiment, the two fibers such as fibers 24, 25 in each pair being provided to give twice the light output compared with a single fiber. The three pairs of fibers in this particular construction thus give three outputs to three separate photocells 23 each of which may have a filter as previously described. A mask system 30 is arranged in front of the fibers having a pattern of apertures such that the three optical outputs from the three pairs of fibers represent three binary digits giving a digital representation of the position of the beam along the length of the fibers. For simplicity in illustrating the invention, the digital output is shown as being uncoded although, as is well known with digitizers, it may be preferable to employ a Gray code or other cyclic permuting code so that, at each change of a digit, only one digit changes at a time. The glass fibers 24—29 may readily be arranged to extend in a cylindrical arc about the axis of rotation of the mirror and thus the angle of rotation can be directly digitized. Obviously more than three digits can readily be employed; the number of digits will depend on the discrimination which is largely determined by the narrowness of the light beam and the length of the arc over which the beam swings.

FIG. 4 illustrates an alternative way of arranging the glass fibers to avoid the use of an apertured mask. Referring to FIG. 4 there are shown three digit fibers 32, 33 and 34, single fibers being illustrated in place of the three pairs of digit fibers shown in FIG. 3. The light beam indicated by the dashed lines 35 is narrow in the horizontal plane but broad enough in a vertical direction to extend over all three fibers. This light beam is swung horizontally along the length of three support members 36, 37 and 38 around which the digit fibers 32, 33 and 34 are wound. These support members are opaque and hence the digit fibers are only exposed to the light beam where they lie on the front surface of the support members. Three digit fibers are arranged with different pitches of winding thereby giving a digital output at photocells 39 in a manner similar to that of FIG. 3.

FIG. 5 illustrates another arrangement for masking the appropriate parts of the digit fibers. Here the various fibers are 41, 42 and 43 are wound to lie either in front or behind a series of opaque blocks 44 forming supports for the fibers. The light beam indicated by the dashed lines 45 is traversed along the front of the assembly and hence can only cause fluorescence when it strikes fibers lying over the front surface of the blocks 44. As in the previously described arrangement, the fluorescence is sensed by photocells 46 at the ends of the fibers.

FIG. 6 illustrates a modification of FIG. 4 in which the fibers are formed into a multiturn helical digitizer. FIG. 6 is an end view of a cylindrical assembly and, for simplicity, only one digit fiber 50 is shown. This extends helically around a support formed by a plurality of opaque members 51 extending longitudinally to define a cylinder. The fiber 50 passes alternately in front of and behind the members 51. Another fiber can pass in front of two opaque members 51 and then behind the next two and so on. The next fibre passes in front of four members 51, then behind four and so on. It will be seen that the construction of FIG. 6 forms a multiturn digitizer similar in many respects to a multiturn electrical potentiometer. A beam of light can be directed axially on to a mirror 52 on the end of a lead screw which has a pitch corresponding to that of the helical fibers. Thus, by making the plane of the mirror at 45° to the axis of the cylindrical assembly, the light is reflected onto the fibers and the light beam is traversed along their length in a helical path as the lead screw is rotated. Photocells at the ends of the fibers thus give a digital output representative of angular rotation for rotation through an angle possibly comprising many complete cycles of rotation.

FIG. 7 illustrates a level detector for detecting the level of a liquid 60. A float 61 containing an alpha particle radiation source can rise up or down with the liquid level within a cylinder 62 constituting a radiation mask. This mask has a series of apertures, such as the apertures 63, through which digit fibers such as fibers 64 and 65 are subjected to radiation from the alpha particle source. This radiation causes scintillation of the glass material of the fibers and hence gives an output from photocells 66 at the end of each digit fiber when the float is opposite an aperture adjacent that particular digit fiber. The various fibers are each associated with a different set of apertures so that the outputs of the photocells represent, in parallel binary digital form, the level of the liquid 60.

FIG. 8 shows in diagrammatic form a method of making a shaft angle digitizer. The shaft whose angle is to be expressed in digital form is shown at 70 and carries a mirror 71 which reflects light from a lamp source and optical system 72 onto the inside of a cylindrical mask 73. The digit fibers, such as 74 and 75, extend circumferentially around the outside of the mask. This mask has apertures (not shown) which result in the various digit fibers being illuminated according to the angular position of the shaft 70 so that a digital output is obtained from photocells 76 at the ends of the fibers.

The construction of FIG. 8 may be modified as shown in FIG. 9 to form a multiturn shaft digitizer by arranging digit fibers such as 80, 81 and 82, in a helical path around a drum 84 constituting the mask. The shaft shown at 85 is threaded so that a mirror 86 on the end of the shaft reflects a beam of light from the light course and optical system 87 onto the digit fibers. The beam had a width, in the axial direction of the shaft, such that it illuminates only one turn of each helical fiber. The masks for the various fibers are arranged so that the outputs from photocells associated with the various fibers constituted a binary coded representation of the shaft angle.

FIG. 10 illustrates a trace reading device in which an analogue trace 90 formed as a transparent line on an opaque background 91 is arranged in front of the digit fibers, of which one only is shown at 92. These digit fibers are masked so that their various outputs fed to photocells 93 at the ends of the fibers give in digital form indication of the position along the length of the fibers at which they are illuminated. The opaque screen 91 is movable transversely between a light source 94 and the digital fibers. This light source 94 provides a fan-shaped beam narrow in the direction of movement of the screen. Thus, as a screen is moved, the output from the digitizer will change in accordance with the amplitude of the analogue function represented by the trace on the screen.

FIG. 11 illustrates an apparatus for digitizing the position of the edge of a movable opaque member on the boundary between a transparent and an opaque section of a movable member. A movable opaque member is illustrated at 100 and can be traversed from left to right or right to left along the length of a number of glass fibers 101, 102, 103, 104 etc. These fibers as before are made of a glass which will fluoresce when subjected to the exciting radiation and each has a photocell at its end. The various fibers are masked, the masks having apertures such as those shown at 108, 109. A radiation source illuminates the whole length of the masked fiber system except in so far as the member 100 obstructs the radiation. With the opaque member in the position shown, if the fibers are irradiated, the light output sensed at the ends of fibers 103 and 104 will be unequal since one mask aperture of fiber 103 is covered by the opaque member 100 whilst no mask apertures of fiber 104 is covered. The output on any other pair of adjacent fibers will be equal since, for example fibers 101 and 102 each have one mask apertures covered whilst fibers 104 etc. do not have any mask apertures covered. The difference between the light outputs of adjacent digit fibers will therefore be quite considerable when the boundary of the opaque member 100 falls between two apertures so that one fiber has one aperture exposed whilst the other has two. In other cases however, where the digit of least significance passes through many decades, the change may only be few percent of the total light output.

It would not be possible in general to match photocells and to expect them to remain matched to a high degree of accuracy. This difficulty however can be overcome, as is shown in FIG. 11, by using photocells shown at 110, 111 and 112 are reciprocated relative to the fibers in a manner such that each photocell sees alternately the light from one and then from another pair of adjacent fibers. Since the fibers are flexible, this relative motion is conveniently effected by keeping the photocells fixed and moving the ends of the fibers mechanically or electromechanically by means of a reciprocatory drive unit 114. The significance of the output from a particular photocell may then be established using a phase sensitive detector 115 locked to the reciprocation frequency. Each photocell thus gives alternately two outputs which are identified with the outputs from two adjacent fibers. The difference of output from any pair of adjacent fiber can thus be determined from a single photocell.

FIG. 12 illustrates a woven two-dimensional array of fibers 116 which, as before, are formed of a material, e.g. a glass which will fluoresce under the exciting radiation. Because the glass is a poor converter of radiation, a significant part of the incident radiation will pass through the front fiber to the one behind when two fibers overlap. Effectively therefore both sets of fibers are illuminated over their whole area. Photocells, some of which are indicated at 117, are provided at one end of each fiber to sense the fluorescent light induced in the fiber by radiation striking it. Thus this arrangement offers the possibility of reading out, in two dimensions, the coordinates of the position of a spot of light. In the arrangement illustrated the fibers are arranged in groups of three, the three fibers being used to indicate respectively the hundreds, tens and units of a coordinate value. The spot of light, indicated by the circle 118, is large enough to cover one fiber of each decade system. In the particular arrangement illustrated, the X coordinate of the position of the light spot 128 is determined by the three fibers marked 120 (representing unity for the hundreds, two for the tens and 0 for the units) whilst the Y coordinate is represented by the three fibers marked 349 (representing 3 for the hundreds 4 for the tens and 9 for the units). By using the photocell output from the fibers to control a feedback system moving the light source, it is possible to direct the light spot to any required digital position. Such an arrangement may be used for example in radar plotting and in X-ray crystallography.

A fiber mat such as illustrated in FIG. 12 can be cast into a transparent material of low refractive index to form the front face of a cathode ray tube. In this case the fluorescence in the fibers may be produced either directly by the electron beam or as a secondary effect of the light produced by that electron beam. Using a feedback system with this arrangement, the electron beam could be deflected to any required point on the screen. The beam striking the screen will give a visual indication in the normal way but the accuracy of the displacement of the beam is determined by the accuracy of the woven glass array and not by the accuracy of the deflection circuit or the electron optics of the cathode ray tube.

I claim:

1. Radiation responsive device comprising means for providing a beam of exciting radiation having a narrow width and moving the beam in a predetermined direction in the general direction of the width of the beam, a plurality of fibers of light transmitting material each extending generally in said predetermined direction within the path of movement of the beam, the fibers being of a material which will fluoresce on exposure to the radiation, masking means through which the radiation can impinge on the fibers along parts of their length and blocking the impingement of said beam along the length of each of said fibers at different parts than the other of said fibers to produce at the various outputs from the different fibers an indication of the position of the beam relative the fibers in coded digital form, and photocell means responsive to the light due to fluorescence which is transmitted along the different fibers by total internal reflection therein to the one ends thereof to indicate the position of the beam in coded digital form.

2. A device as claimed in claim 1 wherein the masking means comprises a physical mask having apertures in front of the fibers.

3. A device as claimed in claim 1 wherein the masking means comprises opaque elements having the fibers wound therearound so that, for part of the lengths of the fibers, they are each behind an element or elements so as to be masked thereby from the beam of exciting radiation.

4. A mirror galvanometer in combination with digital encoding means for giving an electrical output in digital form representative of the position of the light beam from the galvanometer, said encoding means comprising a plurality of elongated fibers positioned to have the light beam impinge thereon, each of said fibers being of light transmitting material which will fluoresce on exposure to the light transmitted to the various ends of the fibers to indicate digitally the position of the beam relative the fibers.

5. A mirror galvanometer as claimed in claim 4 wherein the mask is movable to expose different parts of the fiber along different parts of their length.

6. A liquid level indicator comprising a radiation source arranged on a float, plurality of light-transmitting fibers extending in an upright direction adjacent the float, the fibers being of a material which fluoresces on exposure to radiation from said source, photocells associated with the various fibers to respond to fluorescence which is transmitted along the various individual fibers and masking means opaque to said radiation between the various fibers and said source having apertures through which the radiation can impinge on portions of the various fibers, the apertures being arranged so that the level of the float is indicated digitally by the various outputs from the different fibers.

7. A device for detecting the position of a beam of radiation having a narrow width comprising a plurality of elongated fibers that are spaced from one another in a direction generally transverse to the width direction of the beam, each of said fibers being of a material that will transmit light to its end as it is exposed along at least a portion of its length to said radiation and will fluoresce on exposure to the radiation, masking means for blocking the impingement of the radiation on combinations of the various fibers that selectively varies in the direction of the width dimension of the beam and permitting impingement of the radiation on varying selected lengths of the various fibers to obtain fluorescence of the various fibers as the beam and the plurality of fibers are moved relatively one another in the general directions of elongation of the fibers and photocell means responsive to the light transmitted to the various ends of the fibers to indicate digitally the position of the beam relative the fibers.

8. Radiation responsive apparatus comprising a plurality of elongated light transmitting fibers extending generally in a given direction, each of the fibers being of a material which will fluoresce on exposure to radiation, means for longitudinally scanning the fibers simultaneously with a beam of radiation, photocell means response to light due to fluorescence which is transmitted along the different fibers by total internal reflection therein to the one ends thereof, the photocell means including a photocell for each of said fibers so that a digital output from the fibers is available in parallel form, and masking means through which the radiation can impinge on differing parts of the various fibers along their lengths and blocking impingement of the radiation on another part of each of the fibers at a part that differs from that of the other of said fibers to obtain fluorescence of the various fibers to indicate the position of the beam relative the fibers digitally, said masking means being disposed between the fibers and the scanning means.

9. The apparatus of claim 8 wherein it comprises a liquid level indicator, further characterized in that the scanning means comprises a float having a radiation source thereon, that said fibers extend in an upright direction adjacent said float and that said masking means is between said float and fibers, said masking means having apertures through which the radiation can impinge on parts of the various fibers, the aperture being arranged so that the level of the float is indicated digitally by the various outputs for the different fibers.

10. Radiation responsive apparatus comprising a mirror galvanometer for reflecting a light beam and digital encoding means for giving an electrical output in digital form representative of the position of the light beam, said encoding means comprising a plurality of fibers of light transmitting material which will fluoresce on exposure to the light beam, and transmit light by total internal reflection that is generated by the fluorescence to the one ends of the fibers, a separate mask for each fiber to block impingement of the light beam along part of the length of the respective fiber, and photocell means responsive to the fluorescent light transmitted along the fibers to the one ends thereof, the photocell means including a photocell for each fiber, the mirror galvanometer including means opposite the fibers from the masks for simultaneously scanning the fibers along their lengths, and the various masks being arranged relative the fibers and scanning means to block impingement on parts of the lengths of the various fibers that differs from the parts of the lengths of the other of said fibers and obtain from the various outputs of the different photocells, a digital indication of the position of the beam of light relative the fibers.

PO-1050
(5/69)

UNITED STATES PATENT OFFICE
CERTIFICATE OF CORRECTION

Patent No. 3,553,466          Dated February 23, 1971

Inventor(s) James Stewart Johnston

It is certified that error appears in the above-identified patent and that said Letters Patent are hereby corrected as shown below:

Column 7, line 9 after the "," insert --a--;

Column 7, lines 2 and 3, delete "transmitted to the various ends of the fibers to indicate digitally" and in place thereof insert --beam and transmit light by total internal reflection that is generated by the fluorescense to one end of the fiber, mask means obscuring at least one part of each fiber along part of the length thereof from the light beam from the galvanometer that differ from the parts of the lengths of the other fibers to cause the fibers exposed to the beam to fluoresce in digital form, and photocell means responsive to the fluorescent light transmitted along the fibers to the one ends thereof to digitally indicate.-- (Claim 10 of the Amendment)

Signed and sealed this 11th day of May 1971.

(SEAL)
Attest:

EDWARD M. FLETCHER, JR.
Attesting Officer

WILLIAM E. SCHUYLER, JR
Commissioner of Patent